US009223299B2

(12) United States Patent
Jenkins et al.

(10) Patent No.: US 9,223,299 B2
(45) Date of Patent: Dec. 29, 2015

(54) EQUIPMENT SOUND MONITORING SYSTEM AND METHOD

(71) Applicants: John Jenkins, Nashville, TN (US); Howard Samson, Nashville, TN (US); Mike Stumpf, Nashville, TN (US)

(72) Inventors: John Jenkins, Nashville, TN (US); Howard Samson, Nashville, TN (US); Mike Stumpf, Nashville, TN (US)

(73) Assignee: Discovery Sound Technology, LLC, Nashville, TN (US)

( * ) Notice: Subject to any disclaimer, the term of this patent is extended or adjusted under 35 U.S.C. 154(b) by 433 days.

(21) Appl. No.: 13/690,912

(22) Filed: Nov. 30, 2012

(65) Prior Publication Data

US 2014/0156032 A1     Jun. 5, 2014

(51) Int. Cl.
*G05B 9/02* (2006.01)
*G06F 17/30* (2006.01)

(52) U.S. Cl.
CPC ............ *G05B 9/02* (2013.01); *G06F 17/30755* (2013.01); *G05B 2219/37337* (2013.01)

(58) Field of Classification Search
CPC ............ G05B 9/02; G05B 2219/37337; G06F 17/30755
USPC .................. 700/78; 702/54, 56, 184; 705/305
See application file for complete search history.

(56) References Cited

U.S. PATENT DOCUMENTS

| | | | |
|---|---|---|---|
| 4,287,581 A | 9/1981 | Neale, Sr. | |
| 4,987,769 A | 1/1991 | Peacock et al. | |
| 5,445,026 A | 8/1995 | Eagan | |
| 5,710,377 A | 1/1998 | Youngquist et al. | |
| 5,854,422 A | 12/1998 | McKeon et al. | |
| 5,955,670 A | 9/1999 | Goodman et al. | |
| 6,057,959 A | 5/2000 | Taylor et al. | |
| 6,058,076 A | 5/2000 | Komninos | |
| 6,175,934 B1 | 1/2001 | Hershey et al. | |
| 6,220,098 B1 | 4/2001 | Johnson et al. | |
| 6,247,353 B1 | 6/2001 | Battenberg et al. | |
| 6,666,093 B2 | 12/2003 | Morganti | |
| 6,766,692 B1 | 7/2004 | Eagan | |
| 6,978,675 B2 | 12/2005 | Eagan | |
| 2005/0096873 A1* | 5/2005 | Klein | 702/184 |

(Continued)

OTHER PUBLICATIONS

International Search Report in corresponding International Application No. PCT/US2013/072323, dated Mar. 12, 2014, 3 pp. (not prior art).

*Primary Examiner* — Sean Shechtman
*Assistant Examiner* — Derrick Boateng
(74) *Attorney, Agent, or Firm* — Patterson Intellectual Property Law, P.C.; Lucian Wayne Beavers; Gary L. Montle

(57) ABSTRACT

A system and method for comparative analysis of sound data obtained from client equipment includes a portable sound detection device with a transducer to collect sounds from equipment, convert the collected sounds into analog signals, and generate digital data files including sound data representative of the collected sounds. The data files are stored in a web-based database and remote server-based program modules aggregate data associated with the data files with previously stored and related data across a plurality of predetermined data parameters. The program executes or enables identification of outlying data points with respect to data points from the sound data, and the comparison of sound data with baseline data determined the equipment type, the location and the aggregated data. The program then executes or enables identification of data points from the sound data representative of an equipment failure, or an imminent failure thereof.

20 Claims, 11 Drawing Sheets

(56) References Cited

U.S. PATENT DOCUMENTS

| | | |
|---|---|---|
| 2005/0126264 A1 | 6/2005 | Komninos |
| 2006/0053867 A1 | 3/2006 | Stumpf |
| 2006/0135907 A1 | 6/2006 | Remde et al. |
| 2006/0164097 A1 | 7/2006 | Zhou et al. |
| 2006/0265261 A1* | 11/2006 | Wetzer et al. .............. 705/7 |
| 2007/0109137 A1 | 5/2007 | Farrel |
| 2007/0109138 A1 | 5/2007 | Farrell |
| 2007/0112528 A1 | 5/2007 | Farrell |
| 2008/0147356 A1* | 6/2008 | Leard et al. .................. 702/183 |
| 2009/0196431 A1* | 8/2009 | Gregg .............................. 381/56 |
| 2010/0039271 A1 | 2/2010 | Izikoff et al. |
| 2010/0067708 A1* | 3/2010 | Groth .............................. 381/56 |
| 2010/0097057 A1 | 4/2010 | Karpen |
| 2010/0307860 A1* | 12/2010 | Ellingson ..................... 181/131 |
| 2011/0023585 A1 | 2/2011 | Izikoff |
| 2011/0055669 A1 | 3/2011 | DeHaan et al. |
| 2011/0074589 A1 | 3/2011 | Han et al. |
| 2012/0230482 A1 | 9/2012 | Gavillet |

* cited by examiner

EQUIPMENT SOUND MONITORING SYSTEM AND METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

BACKGROUND OF THE INVENTION

The present invention relates generally to the field of utilizing ultrasound emissions for fault detection in industrial equipment. More particularly, the present invention relates to a system and method for locally collecting sound data from industrial equipment and remotely and centrally diagnosing the sound data for a wide array of industrial equipment to determine the presence of faults and trends to failure that may be used as the basis for corrective action/preventative maintenance programs.

BRIEF SUMMARY OF THE INVENTION

Systems and methods in accordance with the present invention collect at least sound data files from equipment across a number of distributed locations and properties, and leverage the collected data and aggregated variables derived therefrom to perform comparative analysis and recommend corrective action as needed.

In an embodiment of the present invention, a system for comparative analysis of sound data obtained from client equipment includes a portable sound detection device with a transducer to collect analog ultrasound data from equipment, and generate digital data files including electrical impulses as sound data representative of the collected ultrasound. The data files are stored in a web-based database and remote server-based program modules aggregate data associated with the data files with previously stored and related data across a plurality of predetermined data parameters. The program executes or enables identification of outlying data points with respect to data points from the sound data, and the comparison of sound data with baseline data determined the equipment type, the location and the aggregated data. The program then executes or enables identification of data points from the sound data representative of an equipment failure, or an imminent failure thereof.

DETAILED DESCRIPTION OF THE INVENTION

Figure 1:
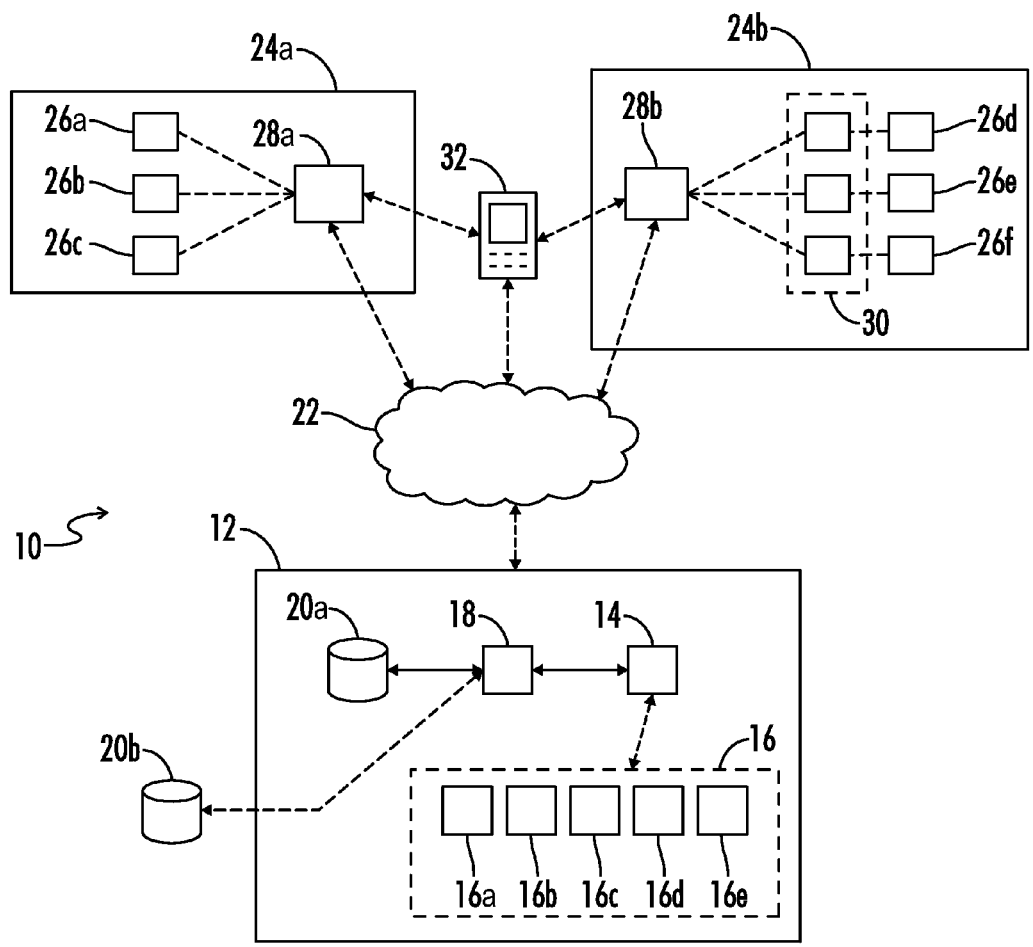
FIG. 1 is a block diagram representing an exemplary embodiment of a centralized diagnostics system according to the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Referring generally to FIGS. 1-10, various exemplary embodiments may be described herein for a system and method for remotely collecting sound data and diagnosing issues in respective industrial equipment. Where the various figures may describe embodiments sharing various common elements and features with other embodiments, similar elements and features are given the same reference numerals and redundant description thereof may be omitted below.

The term "equipment" as used herein is not limited in scope with respect to a particular field of use, but generally refers within the scope of the present invention to electrical, electro-mechanical or electro-mechanical devices, components or systems that generate or emit sound energy representative of flaw, excessive wear and/or failure (e.g., creating measurable changes in air pressure based on changes in work intensity), and may typically include without limitation transformers, switching power converters, air compressors, boilers, chillers, air condensing units, cooling towers, pumps, motors, fans, piston compressors, reciprocal compressors, and the like.

Referring more particularly to FIG. 1, an embodiment of a system 10 according to the present invention includes a server 12 (or alternatively a plurality of functionally and/or communicatively linked servers) upon which may reside a computer-readable storage medium 14, a processor 18 and a database 20. In execution of a method according to the present invention, the server 12 may be linked to or otherwise access an external database 20*b* which may be associated with a remote data source in addition to any hosted or otherwise local databases 20*a* residing on or in association with the hosted server(s) 12.

The term "computer-readable memory medium" 14 as used herein may refer to any non-transitory medium alone or as one of a plurality of non-transitory memory media within which is embodied a computer program product 16 that includes processor-executable software, instructions, program modules, etc., 16*a*-16*e* which upon execution may provide data or otherwise cause a computer system to implement subject matter or otherwise operate in a specific manner as further defined herein. It may further be understood that more than one type of memory media may be used in combination to conduct processor-executable software, instructions, program modules, etc., from a first memory medium upon which the software, instructions, program modules, etc., initially reside to a processor for execution.

Further in execution of various embodiments of a method according to the present invention, the hosted server 12 may be linked or otherwise accessible via a communications network 22 to various external devices 28, 32.

In certain embodiments, a sound detection device 28*a* may be implemented as a portable data collection device 328*b* that is effective to collect at least sound data from equipment 26*a*, 26*b*, 26*c*. The sound detection device 28*a* may further be able to access the communications network and to at least transmit data across the network to the hosted server 12. In an embodiment, the sound detection device 28*a* may include a user interface which can be manipulated by a user to access data locally in addition to transmitting data to and from the hosted server, but alternatively the sound detection device 28*a* may merely collect and store data locally and directly upload the stored data to the hosted server without a local user interface. The sound detection device 28*a* may be effective to generate one or more digital data files comprising at least sound data. The sound detection device 28*a* may comprise a global position detector. Upon equipment 26*a*-*f* being installed in a portable location, the location data may include a first location with respect to the installed equipment 26*a*-*f* and a second location with respect to a global position of the device 28 at a given time.

In certain embodiments, a remote data collection device 30 may be fixed with respect to each individual piece of equipment 26*d*, 26*e*, 26*f*, and/or from each of a plurality of inspection points for the respective equipment. The remote data collection device 30 may be configured to continuously or periodically monitor, collect and store at least sound data from the associated equipment inspection point. A portable data collection device 28*b* may be effective to communicate with the remote data collection device 30 and collect at least sound data stored thereon. The portable data collection device 28*b* may typically include a Barcode/QRCode scanner or the equivalent so as to identify each labeled piece of equipment and/or inspection points, but sound detection components such as would be associated with the sound detection device 28*a* may not be necessary. The portable data collection device 28*b* may further be able to access the communications network and to at least transmit data across the network to the hosted server 12. In an embodiment, the portable data collection device 28*b* may include a user interface which can be manipulated by a user to access data locally in addition to transmitting data to and from the hosted server, but alternatively may merely collect and store data locally and directly upload the stored data to the hosted server without a local user interface.

In yet another embodiment, a device 28 may be fixed in place relative to an inspection point for a piece of equipment 26*a*-*f*, and may include a user interface in addition to the capability to directly upload collected sound data to the server, or to passively transmit stored data to the server in response to a request received via the communications network.

A personal mobile computing device 32 such as for example a smart phone or tablet computer may within the scope of the present invention execute computer program instructions upon user initiation to generate a user interface including dashboards and associated program tools as further described below, and to direct communication and data transmission to and from the server 12, sound detection devices 28, and in certain embodiments even remote data collection devices 30 via appropriate communication networks and components.

In still another embodiment (not shown), a computer program product 16 residing upon a device 28 or a personal mobile computing device 32 may be executable to perform some or substantially all of a method according to the present invention. The device 28, 32 may be able for example to access databases 20*a*, 20*b* via the communications network and further to collect data locally from various pieces of equipment, and otherwise perform various functions including for example the generation of a local user interface to enable the provision and selection of data by a user and further to display options and results.

The term "user interface" as used herein may unless otherwise stated include any input-output module by which a user device facilitates user interaction with respect to at least the hosted server including but not limited to web browsers; web portals such as individual web pages or those collectively defining a hosted website; mobile desktop applications; telephony interfaces such as interactive voice response (IVR); and the like. Such interfaces may in a broader sense include pop-ups or links to third party websites for the purpose of further accessing and/or integrating associated materials, data or program functions via the hosted system and in accordance with methods of the present invention. A user interface may further be described with respect to a sound detection device or personal mobile computing device in the context of buttons and display portions which may be independently arranged or otherwise interrelated with respect to for example a touch screen, and may further include audio and/or visual input/output functionality even without explicit user interactivity.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

An exemplary embodiment of a sound detection device 28*a* may within the scope of the present invention be a device as described in U.S. patent application Ser. No. 12/542,416, entitled "System and Method for Leak Detection," and Ser. No. 12/847,629, entitled "Handheld Ultrasound Detection Apparatus Having a Flexible Tube," both of which are herein incorporated by reference in their entirety.

Figure 9:
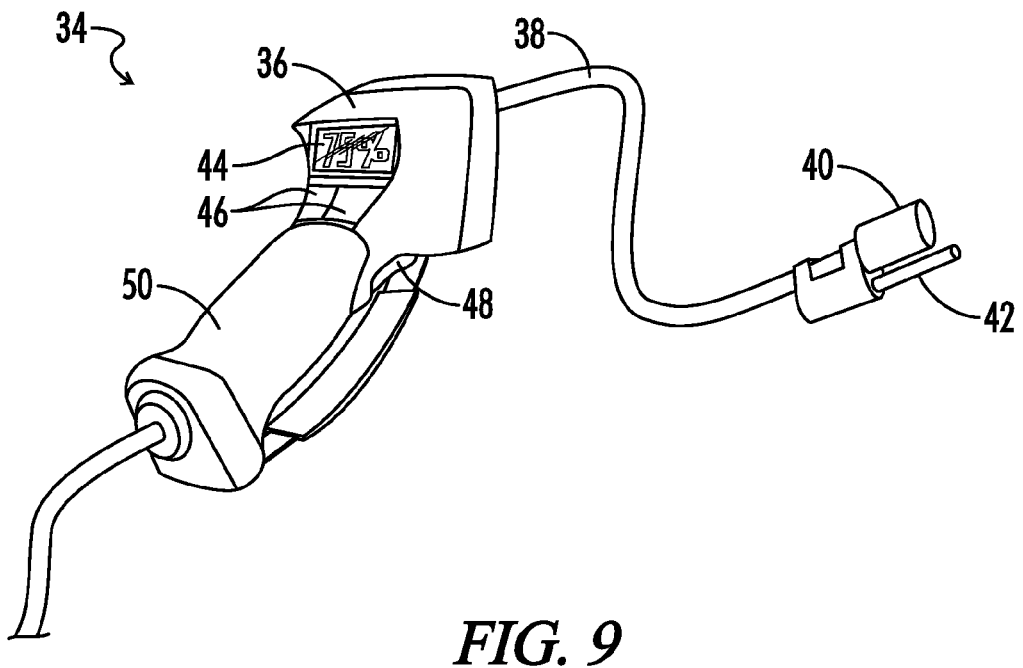
FIG. 9 is a first isometric view of an embodiment of a portable sound detection device in accordance with the present invention.
Figure 10:
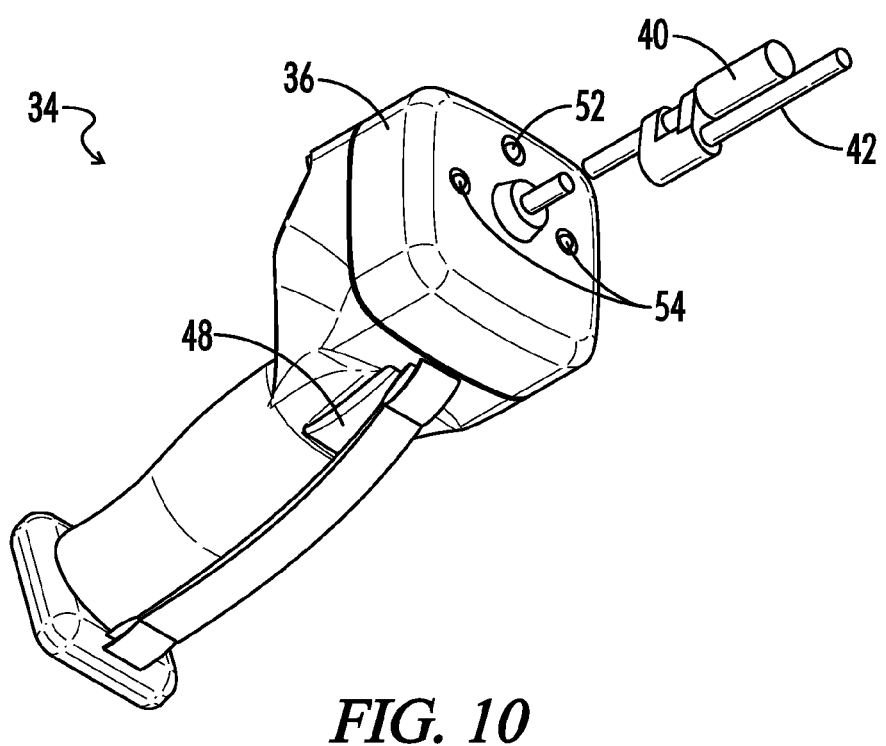
FIG. 10 is a second isometric view of the portable sound detection device of FIG. 9.

By reference to FIGS. 9 and 10, in another embodiment a sound detection device 28*a* may include an ultrasound measurement unit 34 with a portable housing 36 about or within which is disposed a flexible tube 38, a sound cup 40, a distance member 42, a display portion 44, user interface components such as buttons, dials, etc. 46, actuators such as for example a trigger-style button 48, a user grip portion 50, a position indicator such as for example a laser pointer 52, and one or more status indicators such as for example LED lights 54. The portable housing 36 may be effective to generate sound data for a plurality of equipment 26*a*-*f* across a plurality of locations. The sound detection device 28 may include a the flexible tube 38 attached at a first end to the portable housing 36 and the sound cup 40 located at a second end. The sound detection device 28 may be effective to calculate a position of the sound cup 40 relative to a predetermined position with respect to the equipment 26a-f.

The measurement unit 34 as represented in FIGS. 9 and 10 may further include control circuitry and program logic (not shown) so as to perform digital filtering, measurement, and output steps as further described herein. Alternatively, a separate housing (not shown) may be provided in accordance with the present invention that is communicatively and functionally linked to the unit 34 and includes appropriate control circuitry and program logic disposed therein.

The device 28a may further include a second unit (not shown) with a portable housing and an optical scanner or the equivalent as is known in the art along with appropriate software, firmware, logic, etc., for reading barcode labels, QR codes, etc. Alternatively, equivalent functionality may be made available by appropriate configuration of the first unit 34, or the device 28a itself may function in association with a mobile computing device such as for example a smart phone having optical barcode scanning capability as is further known in the art. The device 28a may in this fashion obtain or otherwise receive information at the time of sound data collection with respect to the particular piece of equipment of point of inspection, if such information is made available in the form of a predefined barcode label, QR code or the like.

Various methods of ultrasound detection as performed by the measurement unit 34 may be substantially identical to those described in the above-referenced applications (Ser. No. 12/542,416 and Ser. No. 12/847,629). Additional steps and features as may be performed by a unit 34 within the scope of the present invention may be further described herein.

Generally stated, a device 28 according to the present invention may measure air pressure created from the intensity of the work at the source, rather than mere sound measurement. Sound is but a medium by which we can measure that work in a non-contact manner. One or more piezoelectric transducers disposed within the device 28 are effective to receive analog ultrasound signals and convert the signals to electrical (digital) impulses that are then filtered and amplified by appropriate circuitry and digital logic components.

The device may generate sound data files based on the filtered and amplified digital impulse signals for internal measurement, conversion and display, and further for external transmission to a remote server or other device for storage and analysis as further described below.

The device may further or alternatively convert the filtered and amplified digital impulses back to analog signals for user examination of the represented sound data via for example earphones.

Given the potential importance of very small changes in the work at the source, measurement methods may be provided to effectively communicate those changes to users (e.g., customers, technicians, administrators). In a particular embodiment, a measurement method may be provided to clearly reflect a 10% change in the amount of work in a source as close to 10% as possible, a 20% change in work as close to 20% as possible, and so on. Presenting this in decibels requires the user to do an unnecessary calculation to convert the logarithmic scale to the required linear scale. As a user may typically not be conversant with decibels or have easy access to a conversion tool, presenting the intensity of the work in a percentage format is found to be a much more effective form of communication. Percentage measurements also support simple charting, statistical analytics, and comparisons.

In presenting simple to understand changes in the amount of work at a source, it is beneficial to eliminate points of confusion or error in understanding the percentage value. Due to the mechanics of the source of the sound, different sources of work produce intensity that varies depending on the frequency by which it is measured. In embodiments of the present invention wherein a device is optimized to measure sounds created by mechanical friction, a frequency band may be defined to allow for adequate transmission of sounds from that particular type of source.

Further, wherein various embodiments of a device within the scope of the present invention can distinguish sound from mechanical friction, the impacts of sound from air movement and electricity are also considered in the defined frequency range. The device is tuned to a frequency where sounds from all three sources are prominent but not optimal individually. This allows for measurement and differentiation of sound from each of these sources. As the intensity of measurement with a device changes based on the frequency, the device may prevent (or otherwise not enable) a user from changing the frequency and may also automatically calibrate and tune the device to prevent errors.

To measure small changes in intensity, the resolution of a device may be set to a narrow range of sound intensity that is measured. At the lower or quietest side of the measurement range, the device may measure sound intensity significantly below the amount normally considered as the threshold of hearing, or close to the absence of sound in our frequency range. However, this also may cause a restriction on the maximum amount of sound intensity that can be reflected on the percentage scale. To address this, program logic and filtering may be provided to allow expansion of the measurement range to 400% of the normal maximum scale. As the measurement increases from zero to 400%, the device maintains the linearity of the scale so as to ensure the easy-to-understand representation to the user as to the amount of energy being generated at the source.

For the purpose of ensuring accurate understanding of the zero to 400% scale, the device may be placed in an 'auto' mode that uses analytics to manage the transition between what is normally referred to as gain fields. In some embodiments of a device according to the present invention, a user may also be enabled to selectively freeze the device into a single gain field thus restricting the device to a single zero to 100% range.

Since intensity is greatly affected by changes in angle and distance, another aspect of embodiments of the present invention is to provide a non-contact transducer as close to the source of the sound as possible. A sound cup is coupled to the device that creates a 1" standard measurement point from the source with as close to a zero degree angle as possible. This facilitates consistency of measurement from one source to another and 'pre-defines' the impacts of the loss of intensity due to distance. Additionally, the sound cone may be made from materials that 'block' sound from sources other than the intended source of the sound, thus significantly improving the measurement of the intended source.

By further reference to FIGS. 2-8, various methods according to embodiments of the present invention may now be described with respect to local data collection, filtering, and transmission, and remote server-based diagnostics and data analysis. The methods as presented herein are intended as exemplary, and without implying any limitations with respect to the number of steps or the order in which the steps are to be performed, except where explicitly stated or as logically required. Certain steps described below with respect to certain methods may be wholly unnecessary depending on for example the application, or upon the type of user in a particular application, or further upon the type of equipment, and it may be understood that various intermediate or supplemental steps may be added by one of skill in the art and within the scope of the present invention.

Figure 2:
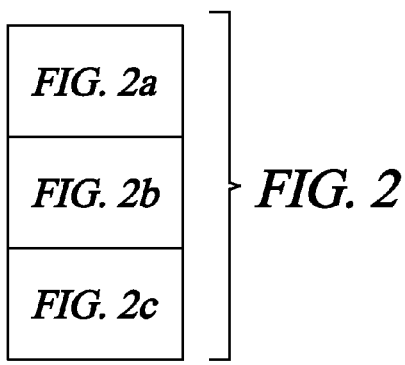
FIGS. 2*a* to 2*c* are flowcharts representing an exemplary embodiment of a centralized diagnostics method according to the present invention.
Figure 2A:
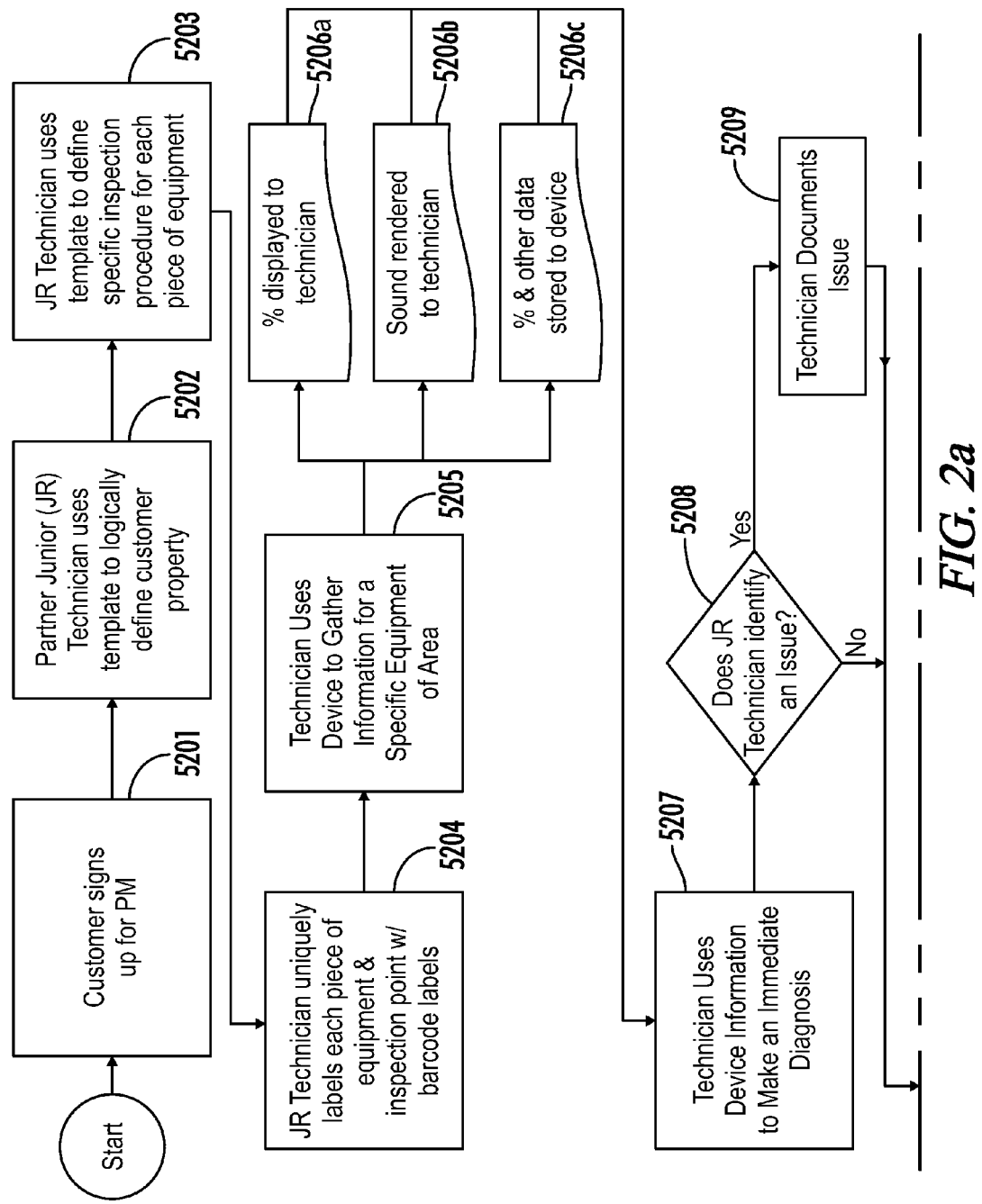
Figure 2B:
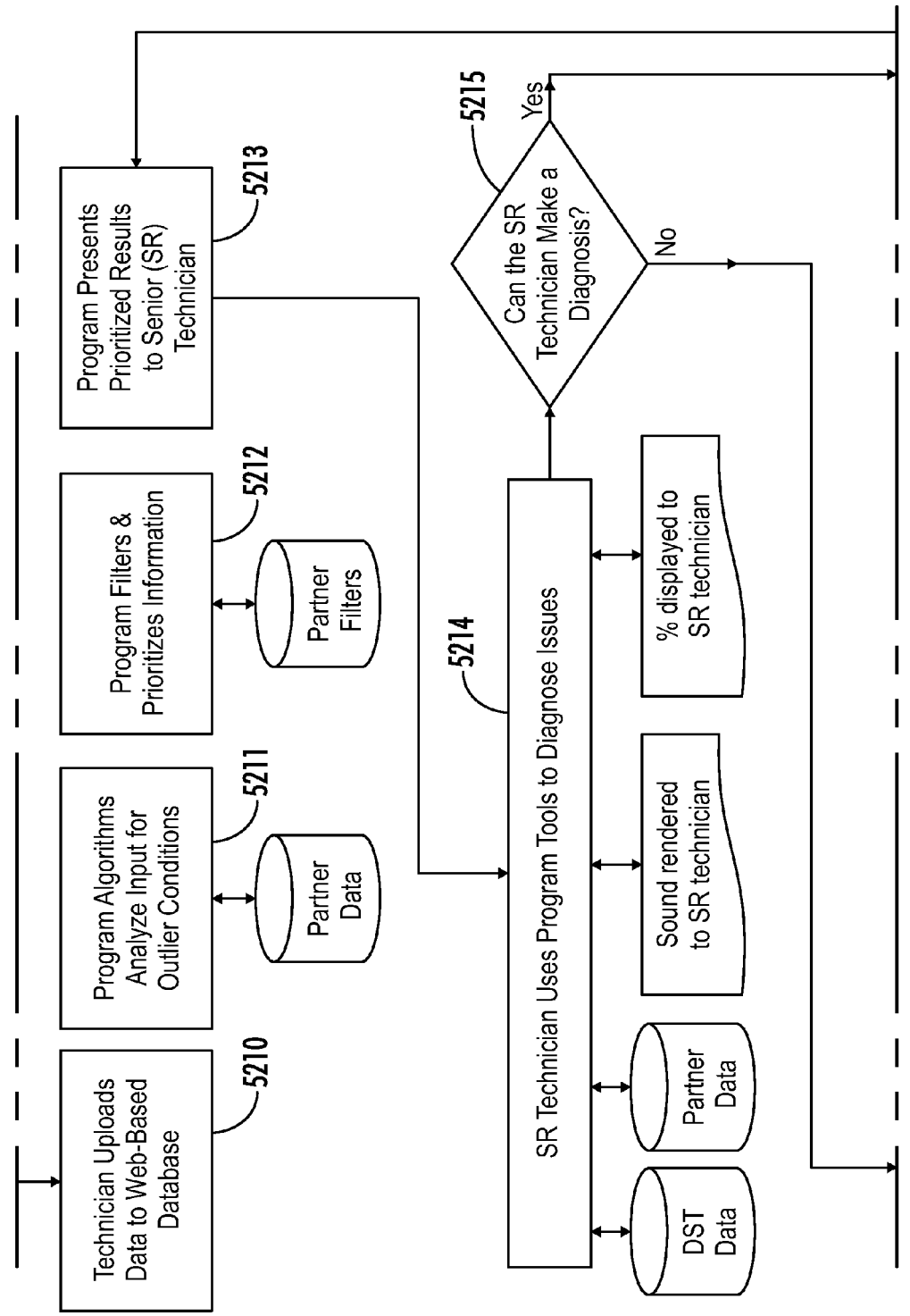
Figure 2C:
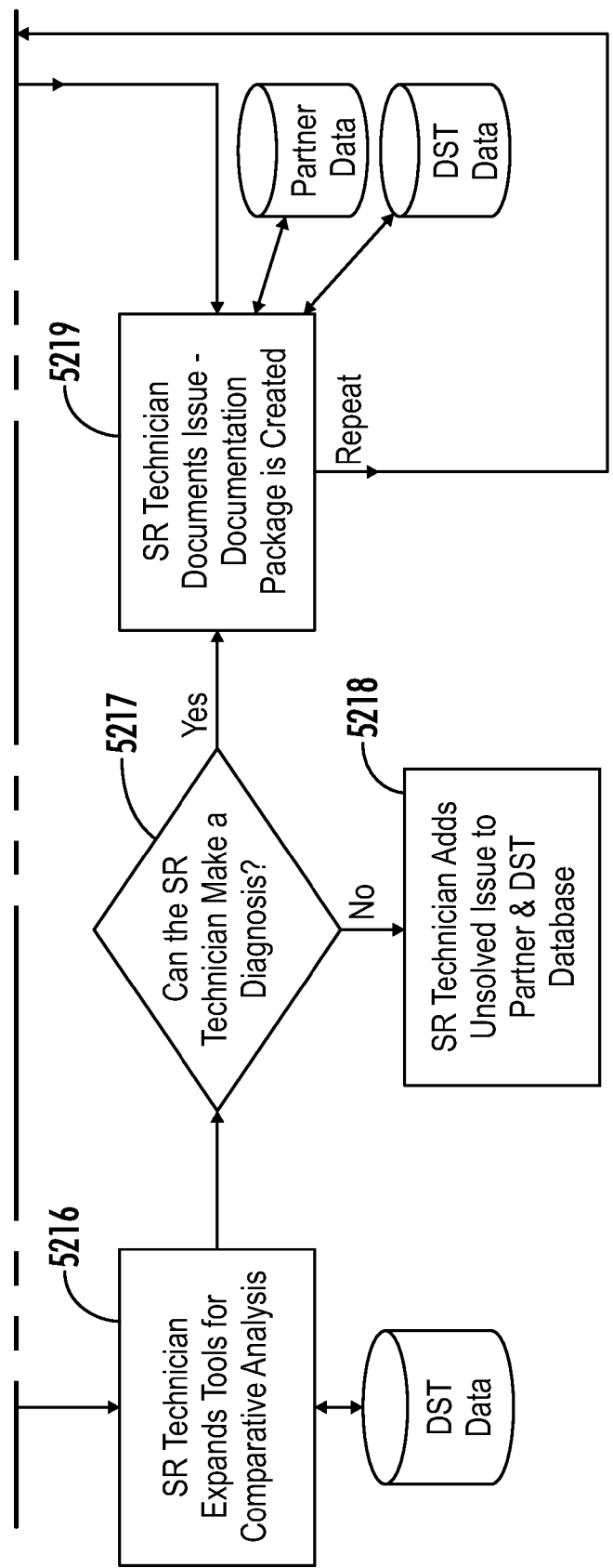

Referring now to FIGS. 2a, 2b and 2c, an exemplary remote diagnostics method may now be described according to an embodiment of the present invention. In a first step S201, a customer associated with one or more pieces of equipment signs up for preventative maintenance (PM) by the host entity or a partner, contractor, associate or the like with respect to the host.

Herein, the term "customer" refers to an entity owning or responsible for a piece of equipment at issue, the term "partner" refers to an entity responsible for collecting at least sound data from the equipment pursuant to a customer request, and the term "host" refers to an entity receiving collected data from the partner and performing back-end diagnostics on at least the sound data. However, it may be understood that in various embodiments there may be overlap among the above-referenced parties, as for example the customer and the partner may be the same entity, or the partner and the host, etc.

A technician associated with the partner may in various embodiments access a user interface generated by software in accordance with the present invention and including for example one or more host-defined templates to logically define the customer property (S202), define specific inspection procedures for each piece of equipment associated with the customer (S203) and subsequently label each piece of equipment and inspection point with machine-readable coded label components such as for example barcode labels or QRCodes (S204). The machine-readable components are specific to each piece of equipment and include data associated with the piece of equipment such that reading/scanning of the component at a later time automatically references and provides the underlying data for a user having access to an associated data source.

Steps S201 to S204 refer generally to a customer initialization sub-process which may be redundant for subsequent iterations of the method. An exemplary implementation of these steps may be a sub-process as further recited below in greater detail with respect to FIG. 3.

The technician/partner then implements a portable sound detection device to gather information for a specific piece of equipment or area (S205). An exemplary implementation of this step may be via a sub-process as further recited below with respect to FIG. 4. The device may typically include a user interface and/or display via which the technician may be presented with data such as for example a percentage of the gain range in which the sound detection circuitry is operating (S206a), and may further be effective to render or replay raw or filtered sounds to the technician (S206b). The data such as the percentage gain range may further be stored to an appropriate storage medium in the device for subsequent retrieval (S206c).

Based on the information collected, processed and made available to the technician as a result of the previous steps, the technician may be able to make an immediate diagnosis of issues associated with the equipment (S207). If the technician identifies an issue (S208—"yes"), the technician may document the issue in a personal mobile computing device or otherwise via a user interface associated with the sound detection device. The collected data (and potentially documented issues) may then be uploaded to the hosted remote database via the communications network (S210).

A computer program product of the present invention may include algorithms to analyze the received data files for outlier conditions (S211), filter and prioritize information extracted from the data files or otherwise calculated or determined from information in the data files (S212), and present the prioritized results to a host technician or administrator of the system (S213). The system may further include program modules and associated tools which enable the host technician to diagnose issues with the equipment from the equipment data, location data, sound files, percentage gain values determined by the sound detection device, and the like (S214).

If the host technician can make a diagnosis with respect to the equipment based on the above-referenced steps (S215—"Yes") the process continues to step S219. If not (S215—"No"), the system may further enable the host technician to expand the number of available program tools and perform a comparative analysis of the data (S216). In various embodiments, some or all of the data received from the sound detection device may be aggregated in one or more databases in association with historical data from the same equipment and/or location, or with respect to related historical data across an entire census of equipment and/or locations. The host technician may therefore be able to access a broader spectrum of data in diagnosing issues in a particular piece of equipment with respect to related equipment, or other equipment from the same area, or collected from the same device or by the same technician, etc.

If the host technician is still unable to make a diagnosis with respect to the equipment (S217—"No"), the system may enable the technician to document an unresolved issue with respect to the equipment in the databases, such as for example in profiles associated with one or more of the equipment, the location, the customer, etc. If the host technician is able to make a diagnosis (S217—"Yes"), the system may enable the technician to document the issue and subsequently generate a documentation package for display, editing and/or delivery.

Figure 3:
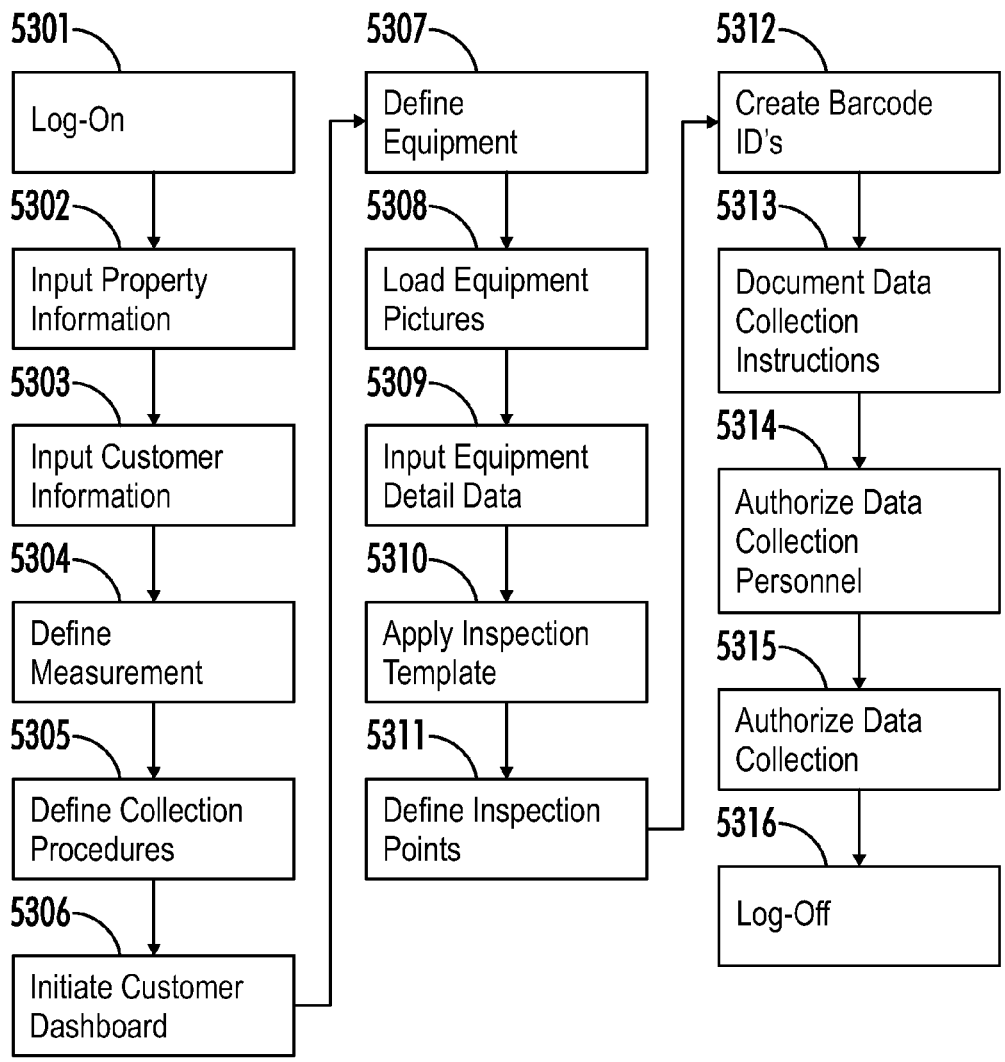
FIG. 3 is a flowchart representing an exemplary customer-end initialization process in accordance with embodiments of the present invention.

Referring now to FIG. 3, an exemplary process may be described whereby an entity such as a program partner in accordance with the present invention may initialize the sound detection process with respect to a particular customer, property or piece of equipment.

The partner initiates the process by logging on to and authorizing use of a computer program product via a user interface generated on a personal mobile computing device (e.g., smart phone) or in certain embodiments as directly embodied in a sound detection device (S301). The program enables the partner to input information regarding the property (S302) and information regarding the customer (S303), such as for example the location and type of property or equipment, name of customer, etc. The program partner may further logically define measurements to be taken (S304) and collection procedures (S305), which may largely be dictated by the type and location of the equipment at issue, further with respect to a template set forth in the computer program.

The partner may then via the program interface initiate the customer dashboard (S306), define the equipment from which data is to be collected (S307), load pictures of the equipment to the program or to an associated database (S308), input equipment detail data associated with the defined equipment (S309), apply an inspection template (S310), and define one or more inspection points with respect to each piece of equipment for subsequent technicians (S311). Identifiers may be generated for each piece of equipment and/or inspection point, and machine-readable components such as barcodes or QR codes generated in association with the identifiers, such that scanning of a barcode yields the ID for the equipment and likewise extracts data associated with the equipment and/or inspection point from the database (S312). The partner may then label each piece of equipment and/or inspection point with the barcodes accordingly, and further document data collection instructions (S313).

The partner entity may further be enabled by the computer program to designate and authorize data collection personnel with respect to each customer, location, piece of equipment, etc. (S314). The program may further enable the designation and authorization of data collection with respect to customers, locations, equipment, and further with respect to a given date, time, etc., as desired by the partner or customer (S315).

Figure 4:
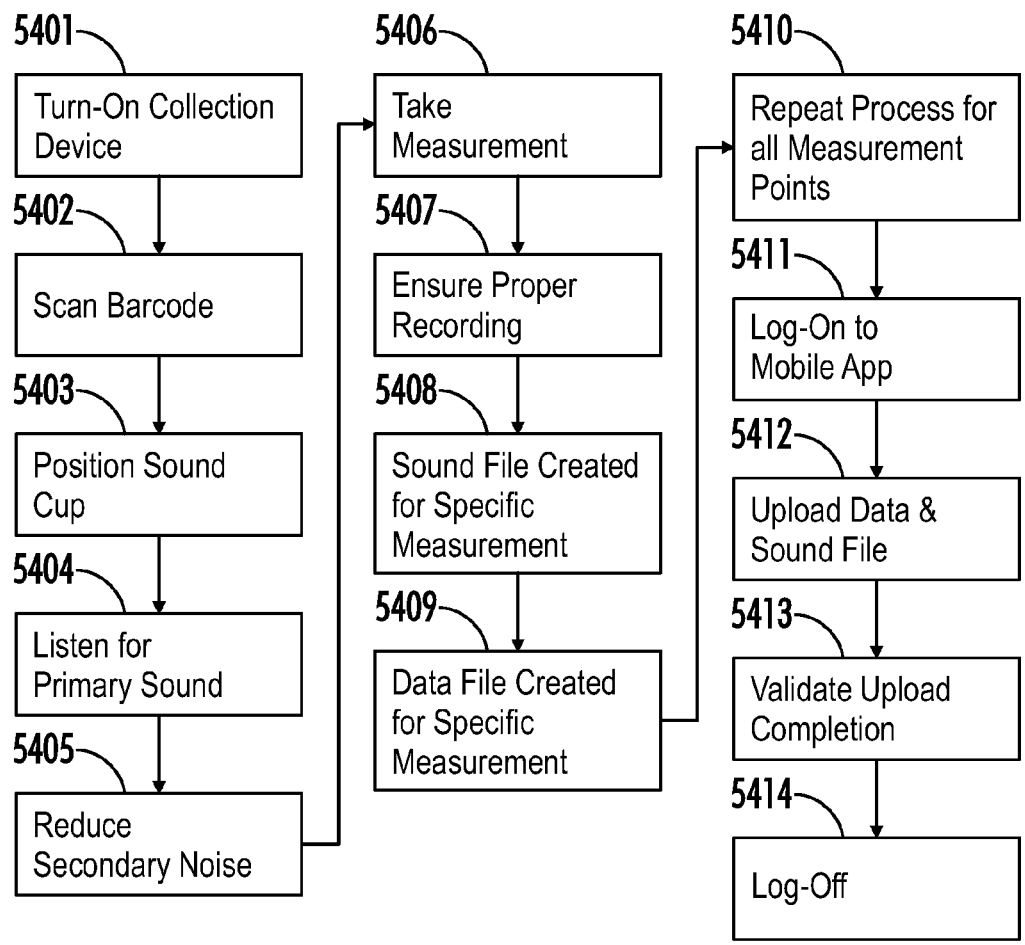
FIG. 4 is a flowchart representing an exemplary data collection process in accordance with embodiments of the present invention.

Referring now to FIG. 4, an exemplary data collection process may be described as may typically be performed by a partner entity in accordance with various embodiments of the present invention. In an embodiment, many steps in the process of FIG. 4 may typically be performed using a sound detection device 34 and associated control circuitry as represented in FIGS. 10-11 and further described below. However, alternative configurations of a sound detection device and control circuitry may be contemplated in view of this description as a whole as being within the scope of the present invention.

A party such as a program partner technician initiates the process by turning on a sound detection device (S401) and scanning a pre-arranged barcode (or alternative machine-readable component) for a piece of equipment or an associated inspection point (S402). Having sufficiently identified the equipment or inspection point, the technician positions a sound cup associated with the sound detection device in accordance with the type and location of the equipment or inspection point (S403). For example, the positioning of the sound cup may typically be dependent on the shape, size, location and/or positioning of the equipment itself. The positioning of the sound cup may typically be predefined in accordance with the process described above with respect to FIG. 3.

The technician may then implement a wireless headset and the sound detection device with sound cup to listen for primary sounds emitted from the equipment (S404), and may interface with the sound detection device to reduce the amount, degree and/or effects of secondary noise emitted from the equipment or otherwise associated with the received sound energy (S405). The technician may then initiate and terminate a sound measurement process (S406), via for example a first and a second user input with respect to a manual actuator such as a button on the sound detection device, and then replay, monitor or otherwise review the sound input to verify a proper sound recording (S407).

The user interface of the sound detection device and appropriate programming may enable the technician to generate a sound file associated with the specific measurement (S408), and further to generate a data file defining for example the equipment, location, time or any other relevant information with respect to that sound measurement (S409). In embodiments, the data file may be an independent data file to be uploaded alongside the sound file. Alternatively, the data file may be a digital object or container within which the sound file is embedded, and further including for example metadata identifying the equipment, location, time or any other relevant information with respect to that sound measurement.

The technician may continue by repeating steps S402-S409 for each inspection point associated with a particular piece of equipment, for each piece of equipment in a particular location, etc. (S410), thereby generating a like plurality of sound files, data files, etc. The technician may then log on to a mobile application via a mobile computing device such as a smart phone (S411), which enables the technician to subsequently upload the sound files, data files, etc., to the remote hosted server for further analysis (S412). Upon validating that the upload is complete (S413), the technician may log off (S414) and potentially continue to another location, customer, etc., wherein the process may be repeated.

Figure 5:
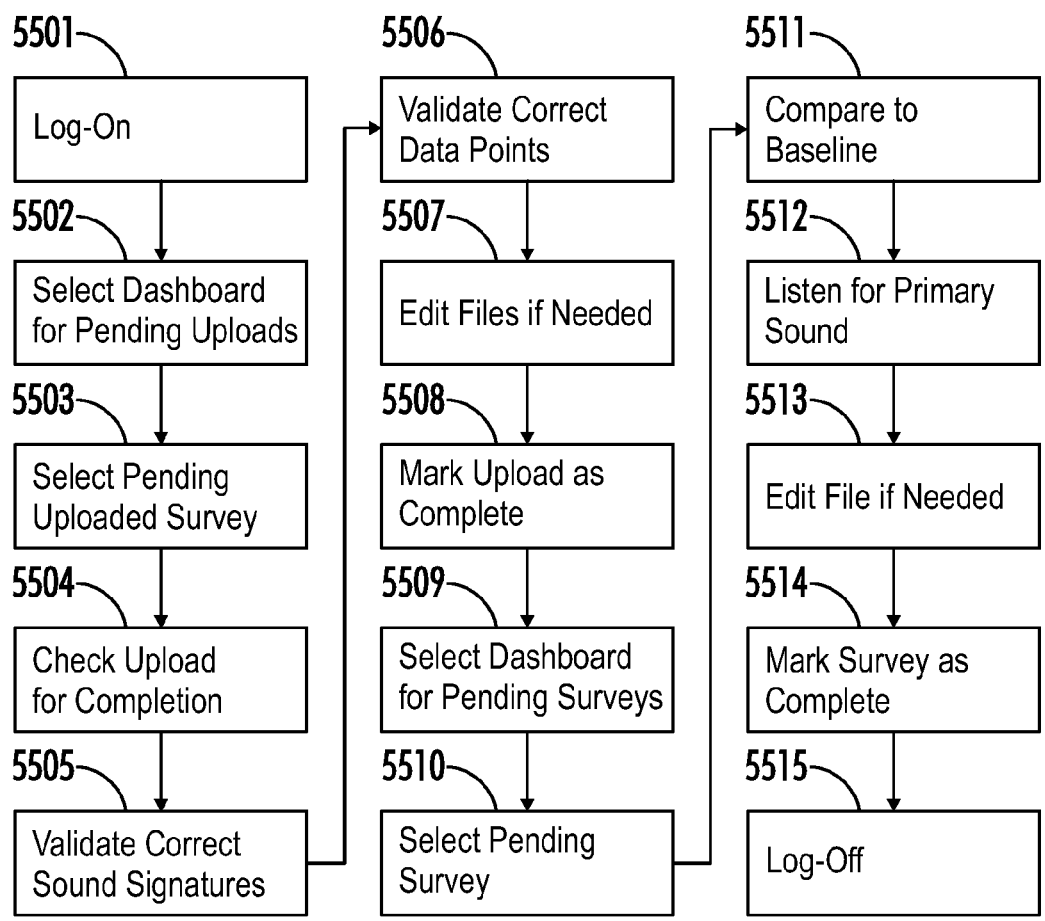
FIG. 5 is a flowchart representing an exemplary data upload and surveying process in accordance with embodiments of the present invention.

Referring now to FIG. 5, an exemplary process may be described whereby a technician associated with a program partner (or for example a technician or administrator associated with the host) in accordance with the present invention may upload and survey the pending uploads of sound and/or data files with respect to a particular customer, property or piece of equipment.

The technician begins by logging in to a user interface (e.g., website) generated by the host program (S501) which enables selection of a dashboard, web page or the like configured for pending uploads (S502), and further enables the selection of any one of a number of pending uploaded surveys (S503). The technician may further be presented with program tools to check that the selected upload has been completed (S504), and further validate sound signatures (S505) and data points (S506) for the associated upload, which steps may include validating merely that sound signatures and data points have been identified in association with the uploaded sound data, or may include some threshold or reference value for comparison against the sound signatures and data points to validate or confirm that the data is appropriate in the context of the identified equipment or inspection point. The technician may further be enabled to edit sound files or data files as needed or desired (S507), and otherwise to tag/mark the upload as complete (S508).

The technician may subsequently be enabled by the user interface to select another dashboard configured for review of pending surveys (i.e., completed uploads) (S509), and further to select any one of a number of pending surveys (S510). The sound data points (e.g., percentage gain values) may be individually compared to baseline data points as for example minimum and/or maximum expected data points, or may be collectively aggregated and compared to baseline data values such as for example mean, median, standard deviations, etc. (S511). The program may further enable the technician to select individual sound files and listen for primary sounds (S512). The technician may further be enabled to edit sound files or data files as needed or desired (S513), and otherwise to tag/mark the survey as complete (S514) and log off from the user interface (S515).

Figure 6:
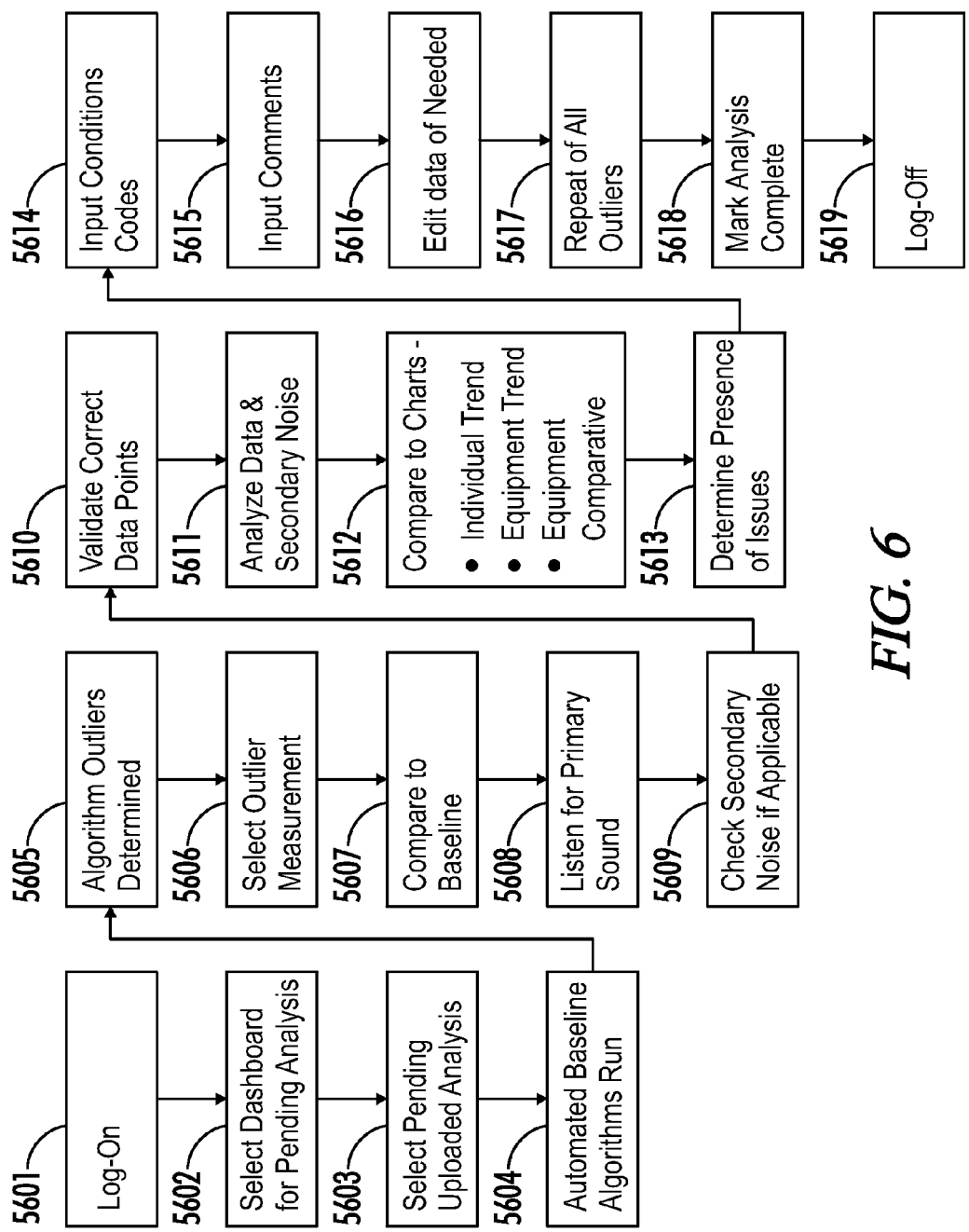
FIG. 6 is a flowchart representing an exemplary data analysis process in accordance with embodiments of the present invention.

Referring now to FIG. 6, an exemplary process may be described whereby a technician associated with a program partner (or for example a technician or administrator associated with the host) in accordance with the present invention may perform analysis the surveyed sound files with respect to a particular customer, property or piece of equipment, and in various embodiments further with respect to historical and aggregated data with respect to a number of customers, properties and equipment.

The technician begins by logging in to a user interface (e.g., website) generated by or in association with the host program (S601) which enables selection of a dashboard configured for pending analysis (S602), and further enables the selection of any one of a number of pending analysis (S603). The technician may implement program tools and back-end algorithms to for example identify or determine baseline data associated with the equipment, and/or inspection point (S604), and further to identify or determine any outliers in the sound data with respect to the data itself or historical data associated therewith, and irrespective of the baseline (S605).

Program tools further may enable the technician to select a particular outlier measurement (S606) and perform a comparative analysis with respect to the identified or determined baseline (S607).

Program tools further may enable the technician to select sound files associated with the selected analysis and listen for primary sound (S608), check for the presence and/or effect of secondary noise where applicable (S609), and validate that the associated data points are correct (S610).

Comparative analysis tools may be provided by the system to enable the technician to analyze the sound data and secondary noise (S611) by way of direct review and analysis of the individual data points or by way of visual comparison via charts, graphs, etc., representing an individual trend, equipment trend, equipment comparisons with respect to historical or aggregated data for related equipment stored in the system, etc. (S612). Using any or all of the above tools, or others as may be known in the art and further provided within the scope of the present invention, the technician may determine the presence of issues with respect to the equipment in question (S613) and input condition codes (S614) and/or comments (S615) in association with the equipment. Such input may be in the form of line items in an equipment profile as may be displayed upon later request with respect to that piece of equipment, or as may take the form of tags or an equivalent that may be searchable by a user with respect to such conditions or comments generally. The technician may edit data as needed or desired (S616).

The process steps S606-S616 may then be repeated (S617) for all outliers having been determined by the system algorithms in step S605, and the technician may subsequently or otherwise mark the analysis as complete (S618). The process steps S603-S618 may likewise be repeated for all uploaded analyses as may be pending. The technician may otherwise log off from the user interface/website/program (S619).

Figure 7:
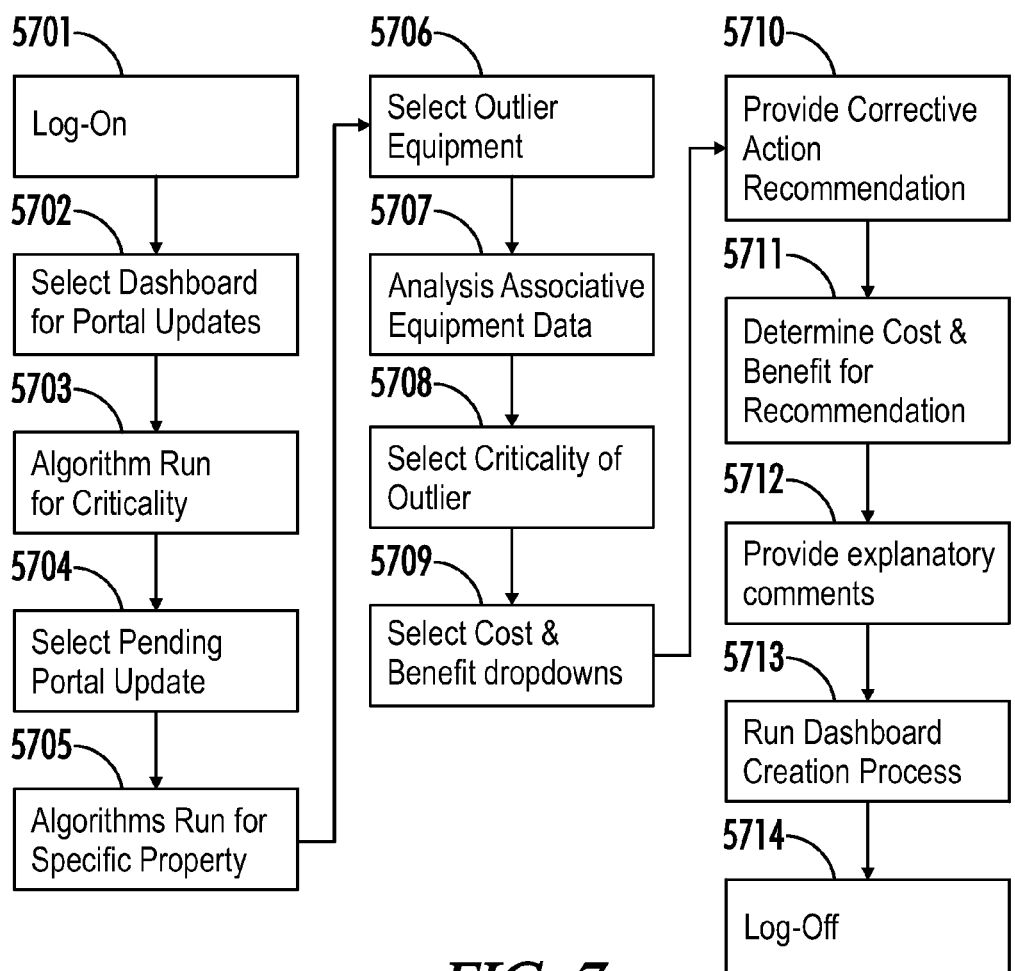
FIG. 7 is a flowchart representing an exemplary user interface process (e.g., host, technician) for analyzing critical data and providing recommendations in accordance with embodiments of the present invention.

Referring now to FIG. 7, an exemplary process may be described whereby an entity such as a program partner in accordance with the present invention may identify critical data based on results from one or more of the above-referenced processes, and perform cost-benefit analyses with respect to maintenance or potential corrective actions.

The technician begins by logging in to a user interface (e.g., website) generated by or in association with the host program (S701) which enables selection of a dashboard configured for portal updates (S702). The technician may implement program tools and back-end algorithms to generate system updates with respect to equipment and/or inspection points and further assess the criticality of results from the previous analyses (S703). Program tools enable the technician to select one from a list of pending portal updates (S704), and execute algorithms to identify and assess critical data points with respect to a specific associated property (S705). The program tools further enable the technician to select outlier equipment with respect to the property, or alternatively from a searchable list of equipment with respect to other key parameters or criteria (S706), and execute algorithms to analyze the associated equipment data (S707).

The technician may be enabled by the system to select, determine or define a criticality of the selected outlier equipment (S708). The dashboard may in various embodiments include a cost-benefit dropdown menu, hyperlinks, or some equivalent that is selectable by the user (S709). The technician may provide a corrective action recommendation (S710), and determine the costs and benefits for the provided recommendation by executing appropriate algorithms from the system (S711). As needed or desired, the technician may provide explanatory comments with respect to the provided recommendation and associated cost-benefit analysis (S712), and execute a dashboard creation process that may for example assemble or modify the customer dashboard based on the results generated in this and previously recited processes of the present invention (S713).

Figure 8:
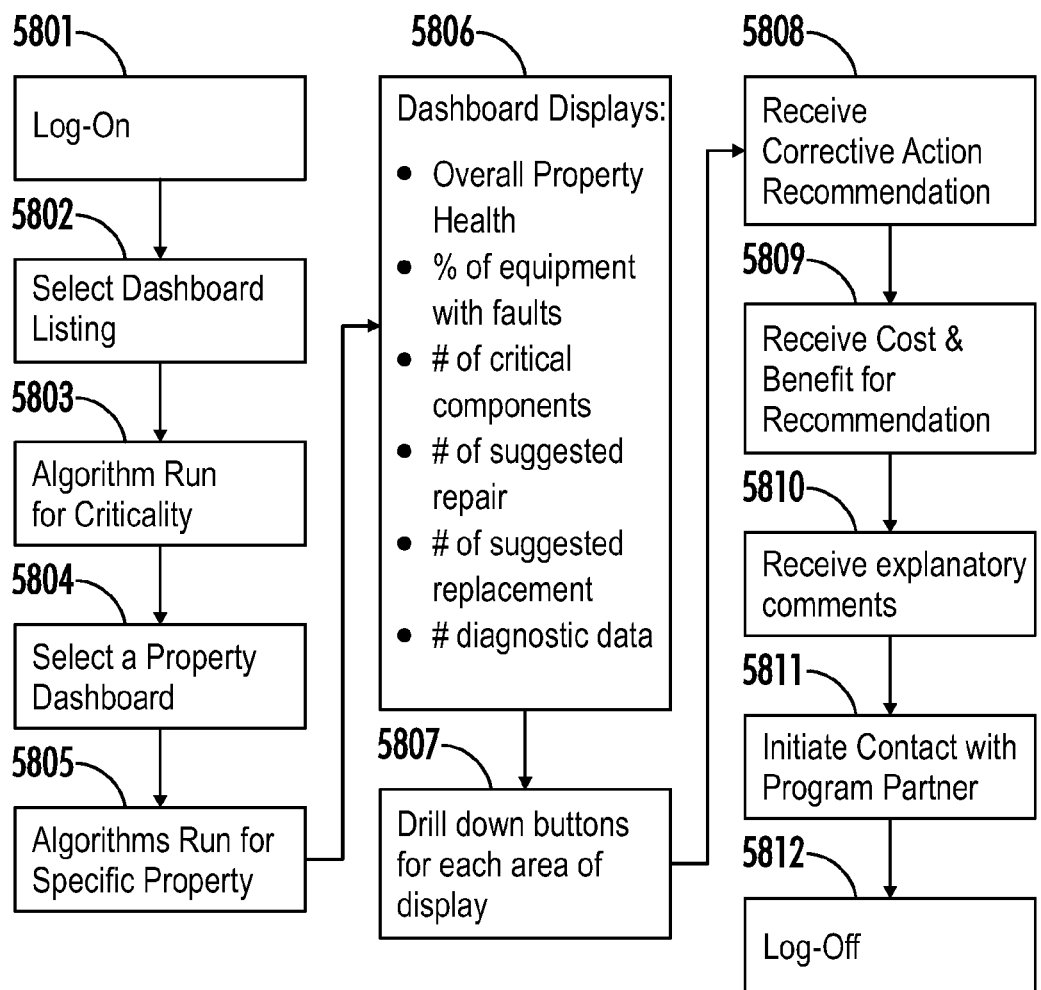
FIG. 8 is a flowchart representing an exemplary user interface process (e.g., client, customer) for receiving, reviewing and filtering results in accordance with embodiments of the present invention.

Referring now to FIG. 8, an exemplary process may be described whereby an entity such as a customer in accordance with the present invention may review results generated by the algorithms and program tools.

The customer begins by logging in to a user interface (e.g., website) generated by or in association with the host program (S801) which enables selection of any one of a number of available dashboards for that customer (S802). The customer may implement program tools and back-end algorithms to generate any critical system updates (S803). Program tools enable the customers to select one from a list of properties (S804), and execute algorithms to generate results for that property and accordingly populate a template for that dashboard with the appropriate results data (S805). Exemplary dashboard displays may include without limitation an overall property health value (which may be for example an assigned value such as "good" or may be a continuous variable as generated using appropriate algorithms and underlying component values); a percentage of equipment with faults; a current number of critical components; a current number of suggested repairs; a current number of suggested replacements; historical values for any of the above; any fixed diagnostic data values and/or diagnostic data variables as may be determined from any of the above (S806).

In various embodiments, the dashboard may be configured to include drill down buttons for each area of display (S807) such that the system may simply expand and display previously hidden data, or may alternatively further provide decision support capabilities such as for example online analytical processing (OLAP) such that the above-referenced values and variables may be analyzed with respect to a number of dimensions (e.g., time, location, technician).

The customer may be enabled by the system to receive (directly or by user selection) a corrective action recommendation as previously provided from a technician (S808), and to review an associated cost-benefit analysis for that recommendation (S809) and any explanatory comments from the technician (S810). If for example the customer elects to conduct further maintenance or other preventative action, the customer may be enabled by the system to directly initiate contact with the program partner or the host itself (S811), or alternatively to simply log off from the system (S812).

The previous detailed description has been provided for the purposes of illustration and description. Thus, although there have been described particular embodiments of the present invention of a new and useful "Equipment Sound Monitoring System and Method," it is not intended that such references be construed as limitations upon the scope of this invention except as set forth in the following claims.

What is claimed is:

1. A system for comparative analysis of sound data obtained from client equipment, the system comprising:
 a sound detection device comprising one or more transducers effective to collect analog sound signals from equipment, the analog sound signals being configured to be used to identify at least one source of work having a variable intensity across a range of measurement frequencies, and one or more transducers being further effective to convert the collected sounds into digital sound data, the device further effective to generate one or more digital datafiles comprising the sound data; and a server comprising a database, a processor, and a computer-readable storage medium having program instructions residing thereon, the instructions effective upon execution by the processor to direct the performance of steps comprising receiving the digital data files from the sound detection device and storing the received data files in the database, aggregating data associated with the data files with previously stored and related data across a plurality of predetermined data parameters, identifying outlying data points with respect to the plurality of data points from the sound data, comparing the sound data with baseline data determined according to one or more baseline criteria selected from an equipment type, a location and the aggregated data, and identifying data points from the sound data representative of an equipment failure associated with the at least one source of work.

2. The system of claim 1, the instructions further effective upon execution by the processor to direct the performance of a step of generating a user interface to enable authorized users to monitor the data points and apply tags to a profile in the database associated with the equipment.

3. The system of claim 1, the instructions further effective upon execution by the processor to direct the performance of a step of identifying data points from the sound data representative of an expected equipment failure, said identification based on one or more of threshold violations, trend patterns and environmental conditions associated with the equipment over a period of time.

4. The system of claim 3, the instructions further effective upon execution by the processor to direct the performance of a step of executing a cost-benefit analysis for maintenance of the equipment based on the identified data points from the sound data representative of equipment failure and expected equipment failure.

5. The system of claim 4, the instructions further effective upon execution by the processor to direct the performance of a step of generating a user interface to enable authorized users to monitor the data points and apply tags to a profile in the database associated with the equipment, said tags comprising priority tags with respect to future maintenance actions upon the equipment.

6. The system of claim 1, the sound detection device comprising a portable housing effective to generate sound data for a plurality of equipment across a plurality of locations, the sound detection device further comprising a flexible tube attached at a first end to the housing and a sound cup located at a second end, the sound detection device effective to calculate a position of the sound cup relative to a predetermined position with respect to the equipment.

7. The system of claim 6, the sound detection device further effective to electronically read equipment data and location data for a piece of equipment from a machine-readable coded label affixed to the equipment.

8. The system of claim 1, the sound detection device comprising a housing fixed relative to a particular piece of equipment, a flexible tube attached at a first end to the housing and a sound cup located at a second end of the tube and positioned relative to a predetermined position with respect to the equipment, the sound detection device effective to generate sound data over time with respect to the equipment.

9. The system of claim 8, the sound detection device further comprising a global position detector, wherein upon the equipment being installed in a portable location the location data further comprising a first location with respect to the equipment and a second location with respect to a global position of the device at a given time.

10. A method for comparative analysis of sound data obtained from client equipment, the system comprising:

receiving analog sound energy from a piece of equipment associated with a client user, identifying at least one source of work having a variable intensity across a range of measurement frequencies, and converting the received sound energy into digital sound data;

generating one or more digital data files comprising the sound data;

transmitting said data files to a remote server via a global communications network;

storing the data files in a database in association with a client profile;

aggregating data associated with the data files with previously stored and related data across a plurality of predetermined data parameters;

identifying outlying data points with respect to the plurality of data points from the sound data;

comparing the sound data with baseline data determined according to one or more baseline criteria selected from an equipment type, a location and the aggregated data; and identifying data points from the sound data representative of an equipment failure associated with the at least one source of work.

11. The method of claim 10, further comprising enabling authorized users of a web-based user interface to monitor the data points and apply tags to the client profile in association with the equipment.

12. The method of claim 10, further comprising identifying data points from the sound data representative of an expected equipment failure, said identification based on one or more of threshold violations, trend patterns and environmental conditions associated with the equipment over a period of time.

13. The method of claim 12, further comprising executing a cost-benefit analysis for maintenance of the equipment based on the identified data points from the sound data representative of equipment failure and expected equipment failure.

14. The method of claim 13, further comprising enabling authorized users of a web-based user interface to monitor the data points and apply tags to a profile in the database associated with the equipment, said tags comprising priority tags with respect to future maintenance actions upon the equipment.

15. The method of claim 10, further comprising positioning a sound cup for a portable sound detection device relative to a predetermined position with respect to the piece of client equipment.

16. The method of claim 15, further comprising electronically reading equipment data and location data for the piece of equipment from a machine-readable coded label affixed to the equipment.

17. A non-transitory computer-readable storage medium having program instructions residing thereon, the instructions effective upon execution by a processor to perform a comparative analysis of sound data obtained from client equipment comprising the steps of:

receiving digital data files comprising sound data representative of sounds collected from a piece of client equipment;

storing the received data files in a database functionally linked to the processor;

aggregating data associated with the data files with previously stored and related data across a plurality of predetermined data parameters;

identifying outlying data points with respect to the plurality of data points from the sound data;

comparing the sound data with baseline data determined according to one or more baseline criteria selected from an equipment type, a location and the aggregated data; and identifying data points from the sound data representative of an equipment failure associated with at least one source of work, wherein the at least one source of work is configured to be identified according to a variable intensity across a range of measurement frequencies.

18. The computer-readable storage medium of claim 17, the instructions further effective upon execution by the processor to direct the performance of a step of generating a user interface to enable authorized users to monitor the data points and apply tags to a profile in the database associated with the equipment.

19. The computer-readable storage medium of claim 17, the instructions further effective upon execution by the processor to direct the performance of a step of identifying data points from the sound data representative of an expected equipment failure, said identification based on one or more of threshold violations, trend patterns and environmental conditions associated with the equipment over a period of time.

20. The computer-readable storage medium of claim 19, the instructions further effective upon execution by the processor to direct the performance of a step of executing a cost-benefit analysis for maintenance of the equipment based on the identified data points from the sound data representative of equipment failure and expected equipment failure.

* * * * *